(12) United States Patent
Naito et al.

(10) Patent No.: US 11,001,722 B2
(45) Date of Patent: May 11, 2021

(54) AQUEOUS PIGMENT DISPERSION AND METHOD FOR PRODUCING THE SAME

(71) Applicant: DIC Corporation, Tokyo (JP)

(72) Inventors: Wakana Naito, Kitaadachi-gun (JP); Kenji Sugo, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 162 days.

(21) Appl. No.: 16/374,998

(22) Filed: Apr. 4, 2019

(65) Prior Publication Data
US 2019/0322883 A1   Oct. 24, 2019

(30) Foreign Application Priority Data

Apr. 18, 2018 (JP) .............................. JP2018-079887

(51) Int. Cl.
| | | |
|---|---|---|
| *C09D 11/107* | (2014.01) | |
| *C09D 11/322* | (2014.01) | |
| *C09D 11/033* | (2014.01) | |
| *C09D 11/03* | (2014.01) | |
| *C09D 11/36* | (2014.01) | |

(52) U.S. Cl.
CPC ............ *C09D 11/107* (2013.01); *C09D 11/03* (2013.01); *C09D 11/033* (2013.01); *C09D 11/322* (2013.01); *C09D 11/36* (2013.01)

(58) Field of Classification Search
None
See application file for complete search history.

(56) References Cited

U.S. PATENT DOCUMENTS

2016/0160050 A1\* 6/2016 Kido .................. C09B 67/0002
524/90

FOREIGN PATENT DOCUMENTS

JP     2006-152145 A     6/2006

OTHER PUBLICATIONS

Sci-Finder Datasheet for Fastogen Super Magenta RY p. 1 (Year: 2020).\*

\* cited by examiner

*Primary Examiner* — Robert T Butcher
(74) *Attorney, Agent, or Firm* — Westerman, Hattori, Daniels & Adrian, LLP

(57) ABSTRACT

It is an object of the present invention to provide an aqueous pigment dispersion that can be used to produce an ink with high ejection stability and long-term storage stability and has high dispersibility with a lower likelihood of causing aggregation or precipitation of pigments. The present invention relates to an aqueous pigment dispersion containing a pigment dispersing resin (A), a pigment (B), an organic solvent (C), and an aqueous medium (D), wherein the pigment dispersing resin (A), the pigment (B), and the organic solvent (C) have specified Hansen solubility parameters.

9 Claims, 1 Drawing Sheet

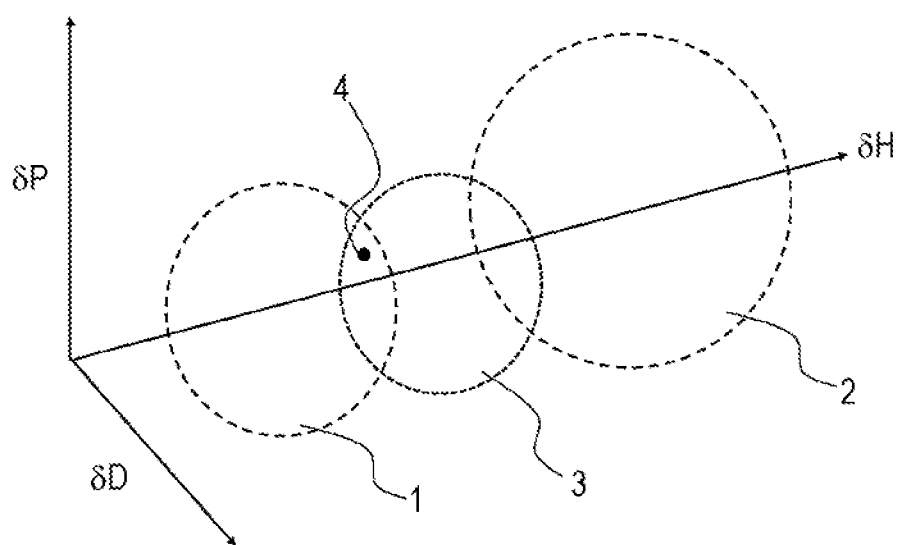

AQUEOUS PIGMENT DISPERSION AND METHOD FOR PRODUCING THE SAME

BACKGROUND OF THE INVENTION

1. Field of the Invention

The present invention relates to an aqueous pigment dispersion that can be used to produce various inks, such as ink jet recording inks.

2. Description of the Related Art

Inks for use in an ink jet printing method are required to be consistently ejected for extended periods (ejection stability) without causing non-ejection or ejection failures due to aggregation of pigments in printing.

Furthermore, inks for use in an ink jet printing method are required to have storage stability without aggregation or precipitation of pigments even in long-term storage.

An aqueous pigment dispersion that is less likely to cause aggregation or precipitation of pigments is usually preferably used as a raw material to produce an ink with ejection stability and storage stability.

A known aqueous pigment dispersion that is less likely to cause aggregation of pigments contains a pigment, a pigment dispersing resin, an organic solvent, and water, for example (see Japanese Unexamined Patent Application Publication No. 2006-152145, for example).

However, a known combination of a pigment, a pigment dispersing resin, and an organic solvent may insufficiently prevent aggregation of pigments and sometimes cannot provide an ink with very high ejection stability and storage stability. In particular, cyan pigments are more likely to aggregate than yellow pigments and tend to form many coarse particles. Thus, a suitable combination of a pigment, a pigment dispersing resin, and an organic solvent to produce an ink with very high ejection stability and storage stability is sometimes found after much trial and error.

As described above, an aqueous pigment dispersion contains many raw materials, such as a pigment, a pigment dispersing resin, an organic solvent, and water. In particular, a combination of a pigment, a pigment dispersing resin, and an organic solvent is important in maintaining high ejection stability of the aqueous pigment dispersion.

However, a pigment, a pigment dispersing resin, and an organic solvent are empirically chosen from various types of materials to produce a known aqueous pigment dispersion. Thus, an aqueous pigment dispersion required by the industry is actually found only after repeated trial and error. Thus, the development of a production method that can improve the efficiency of development of an aqueous pigment dispersion optimum for demand characteristics has been required in industry.

SUMMARY OF THE INVENTION

Accordingly, it is an object of the present invention to provide an aqueous pigment dispersion that can be used to produce an ink with high ejection stability and long-term storage stability and has high dispersibility with a lower likelihood of causing aggregation or precipitation of pigments.

It is another object of the present invention to provide a method for producing an aqueous pigment dispersion that can improve the development and the efficiency of development of an aqueous pigment dispersion.

The present inventor has found that these objects can be achieved by selecting an optimum combination from enormous numbers of pigments, pigment dispersing resins, and organic solvents on the basis of the Hansen solubility parameters of a pigment, a pigment dispersing resin, and an organic solvent contained in an aqueous pigment dispersion.

The present invention relates to an aqueous pigment dispersion containing a pigment dispersing resin (A), a pigment (B), an organic solvent (C), and an aqueous medium (D), wherein the pigment dispersing resin (A) has a solubility sphere (a1) and a solubility sphere (a2), the solubility sphere (a1) being defined by a central coordinate ($\delta H^1$, $\delta D^1$, $\delta P^1$) represented by a hydrogen bonding term ($\delta H^1$), a dispersion term ($\delta D^1$), and a polarity term ($\delta P^1$) of a Hansen solubility parameter and an interaction radius (r1), the solubility sphere (a2) being defined by a central coordinate ($\delta H^2$, $\delta D^2$, $\delta P^2$) represented by a hydrogen bonding term ($\delta H^2$), a dispersion term ($\delta D^2$), and a polarity term ($\delta P^2$) of a Hansen solubility parameter and an interaction radius (r2), the solubility sphere (a1) is derived from a hydrophobic structure of the pigment dispersing resin (A), and the solubility sphere (a2) is derived from a hydrophilic structure of the pigment dispersing resin (A), the pigment (B) has a solubility sphere (b3) defined by a central coordinate ($\delta H^3$, $\delta D^3$, $\delta P^3$) represented by a hydrogen bonding term ($\delta H^3$), a dispersion term ($\delta D^3$), and a polarity term ($\delta P^3$) of a Hansen solubility parameter and an interaction radius (r3), a combination of the pigment dispersing resin (A) and the pigment (B) satisfies the following formula (1), and $$[4\times(\delta H^3-\delta H^1)^2+(\delta D^3-\delta D^1)^2+(\delta P^3-\delta P^1)^2]^{1/2} \leq [r1+r3] \quad (1)$$

a central coordinate ($\delta H^4$, $\delta D^4$, $\delta P^4$) represented by a hydrogen bonding term ($\delta H^4$), a dispersion term ($\delta D^4$), and a polarity term ($\delta P^4$) of a Hansen solubility parameter of the organic solvent (C) satisfies the formula (4) and at least one of the following formulae (2) and (3).

$$[4\times(\delta H^4-\delta H^1)^2+(\delta D^4-D^1)^2+(\delta P^4-P^1)^2]^{1/2} \leq r1 \quad (2)$$

$$[4\times(\delta H^4-H^3)^2+(\delta D^4-D^3)^2+(\delta P^4-\delta P^3)^2]^{1/2} \leq r3 \quad (3)$$

$$[4\times(\delta H^4-\delta H^2)^2+(\delta D^4-\delta D^2)^2+(\delta P^4-\delta P^2)^2]^{1/2} \geq r2 \quad (4)$$

Because of its high dispersibility with a lower likelihood of causing aggregation or precipitation of pigments, an aqueous pigment dispersion according to the present invention can be used to produce inks that require high ejection stability and long-term storage stability, such as ink jet recording inks.

In accordance with the present invention, an optimum combination can be efficiently chosen from enormous numbers of pigments, pigment dispersing resins, and organic solvents on the basis of the Hansen solubility parameters. Thus, the present invention can dramatically improve the development and production efficiency of an aqueous pigment dispersion.

BRIEF DESCRIPTION OF THE DRAWING

FIGURE is a conceptual view illustrating the positional relationship between the Hansen solubility parameters of a pigment dispersing resin (A), a pigment (B), and an organic solvent (C) that satisfy all the formulae (1) to (4).

DESCRIPTION OF THE PREFERRED EMBODIMENTS

An aqueous pigment dispersion according to the present invention is an aqueous pigment dispersion containing a pigment dispersing resin (A), a pigment (B), an organic solvent (C), and water (D), wherein the pigment dispersing resin (A) has a solubility sphere (a1) and a solubility sphere (a2), the solubility sphere (a1) being defined by a central coordinate ($\delta D^1$, $\delta P^1$, $\delta H^1$) represented by a dispersion term ($\delta D^1$), a polarity term ($\delta P^1$), and a hydrogen bonding term ($\delta H^1$) of a Hansen solubility parameter and an interaction radius (r1), the solubility sphere (a2) being defined by a central coordinate ($\delta D^2$, $\delta P^2$, $\delta H^2$) represented by a dispersion term ($\delta D^2$), a polarity term ($\delta P^2$), and a hydrogen bonding term ($\delta H^2$) of a Hansen solubility parameter and an interaction radius (r2), the solubility sphere (a1) is derived from a hydrophobic structure of the pigment dispersing resin (A), and the solubility sphere (a2) is derived from a hydrophilic structure of the pigment dispersing resin (A), the pigment (B) has a solubility sphere (b3) defined by a central coordinate ($\delta D^3$, $\delta P^3$, $\delta H^3$) represented by a dispersion term ($\delta D^3$), a polarity term ($\delta P^3$), and a hydrogen bonding term ($\delta H^3$) of a Hansen solubility parameter and an interaction radius (r3), a combination of the pigment dispersing resin (A) and the pigment (B) satisfies the following formula (1), and a central coordinate ($\delta D^4$, $\delta P^4$, $\delta H^4$) represented by a dispersion term ($\delta D^4$), a polarity term ($\delta P^4$), and a hydrogen bonding term ($\delta H^4$) of a Hansen solubility parameter of the organic solvent (C) satisfies the formula (4) and at least one of the following formulae (2) and (3).

$$[4\times(\delta D^3-\delta D^1)^2+(\delta P^3-P^1)^2+(\delta H^3-\delta H^1)^2]^{1/2}\leq[r1+r3] \quad (1)$$

$$[4\times(\delta D^4-\delta D^1)^2+(\delta P^4-\delta P^1)^2+(\delta H^4-\delta H^1)^2]^{1/2}\leq r1 \quad (2)$$

$$[4\times(\delta D^4-\delta D^3)^2+(\delta P^4-\delta P^3)^2+(\delta H^4-\delta H^3)^2]^{1/2}\leq r3 \quad (3)$$

$$[4\times(\delta D^4-\delta D^2)^2+(\delta P^4-\delta P^2)^2+(\delta H^4-\delta H^2)^2]^{1/2}\geq r2 \quad (4)$$

The pigment dispersing resin (A), the pigment (B), and the organic solvent (C) have their intrinsic Hansen solubility parameters. In the present invention, the Hansen solubility parameters of the pigment dispersing resin (A) and the pigment (B) are determined by a method described below, and the Hansen solubility parameter of the organic solvent (C) is a value described in the computer software Hansen Solubility Parameters in Practice 4th Edition 4.1.07 (HSPiP).

The Hansen solubility parameter of the pigment dispersing resin (A) is determined by the following method.

First, 9.95 g of each of 25 organic solvents described later and 0.05 g of the pigment dispersing resin (A) are mixed by shaking for 30 minutes to prepare 25 compositions with the concentration of the pigment dispersing resin (A) being 0.5% by mass. When the pigment dispersing resin (A) has a hydrophilic group, such as a carboxy group, the acid group, such as a carboxy group, is entirely neutralized with potassium hydroxide to produce a neutralized material. 0.05 g of the neutralized material and 9.95 g of each of the organic solvents are mixed by shaking for 30 minutes to prepare 25 compositions with the concentration of the pigment dispersing resin (A) being 0.5% by mass.

The compositions are then left standing at 25° C. for 24 hours.

After 24 hours, the compositions are visually inspected. Organic solvents in compositions without precipitates are classified as "good solvents", and organic solvents in compositions with precipitates are classified as "poor solvents".

The 25 organic solvents and their classes are input into the computer software Hansen Solubility Parameters in Practice 4th Edition 4.1.07 (HSPiP) to determine a solubility sphere (a1) defined by a central coordinate ($\delta D^1$, $\delta P^1$, $\delta H^1$) represented by a dispersion term ($\delta D^1$), a polarity term ($\delta P^1$), and a hydrogen bonding term ($\delta H^1$) of a Hansen solubility parameter and an interaction radius (r1) and to determine a solubility sphere (a2) defined by a central coordinate ($\delta D^2$, $\delta P^2$, $\delta H^2$) represented by a dispersion term ($\delta D^2$), a polarity term ($\delta P^2$), and a hydrogen bonding term ($\delta H^2$) of a Hansen solubility parameter and an interaction radius (r2). The Hansen solubility parameter of the pigment dispersing resin (A) is defined by the solubility sphere (a1) and the solubility sphere (a2).

The Hansen solubility parameter of the pigment (B) is determined by the following method.

First, 9.99 g of each of 16 organic solvents described later and 0.01 g of a pigment (B) are mixed by shaking for 30 minutes to prepare 16 compositions with the concentration of the pigment (B) being 0.1% by mass.

The compositions are then left standing at 25° C. for 24 hours.

After 24 hours, the composition is visually inspected. Organic solvents from which approximately 50% or more by mass of the pigment (B) is precipitated are classified as "poor solvents", and organic solvents from which no pigment (B) or less than approximately 50% by mass of the pigment (B) is precipitated are classified as "good solvents".

The 16 organic solvents and their classes are input into the computer software Hansen Solubility Parameters in Practice 4th Edition 4.1.07 (HSPiP) to determine a solubility sphere (b3) defined by a central coordinate ($\delta D^3$, $\delta P^3$, $\delta H^3$) represented by a dispersion term ($\delta D^3$), a polarity term ($\delta P^3$), and a hydrogen bonding term ($\delta H^3$) of a Hansen solubility parameter and an interaction radius (r3). The Hansen solubility parameter of the pigment (B) is defined by the solubility sphere (b3).

The Hansen solubility parameter of the organic solvent (C) in the present invention defined by a central coordinate ($\delta D^4$, $\delta P^4$, $\delta H^4$) represented by a dispersion term ($\delta D^4$), a polarity term ($\delta P^4$), and a hydrogen bonding term ($\delta H^4$) is a value described in the computer software Hansen Solubility Parameters in Practice 4th Edition 4.1.07 (HSPiP).

The pigment dispersing resin (A) in the present invention has the solubility sphere (a1) and the solubility sphere (a2), the solubility sphere (a1) being defined by the central coordinate ($\delta D^1$, $\delta P^1$, $\delta H^1$) represented by the dispersion term ($\delta D^1$), the polarity term ($\delta P^1$), and the hydrogen bonding term ($\delta H^1$) of the Hansen solubility parameter and the interaction radius (r1), the solubility sphere (a2) being defined by the central coordinate ($\delta D^2$, $\delta P^2$, $\delta H^2$) represented by the dispersion term ($\delta D^2$), the polarity term ($\delta P^2$), and the hydrogen bonding term ($\delta H^2$) and the interaction radius (r2).

The solubility sphere (a1) is derived from a hydrophobic structure of the pigment dispersing resin (A), and the solubility sphere (a2) is derived from a hydrophilic structure of the pigment dispersing resin (A). Thus, the pigment dispersing resin (A) having the solubility sphere (a1) and solubility sphere (a2) may be an amphiphilic resin.

The hydrophobic structure of the pigment dispersing resin (A) may be a structure without a hydrophilic group, for example, an aromatic ring structure or a heterocyclic structure, preferably a benzene ring structure, more preferably a styrene-derived structure.

The hydrophilic structure of the pigment dispersing resin (A) may be a structure with a hydrophilic group, for example, an anionic group, such as a carboxy group, a sulfonate group, or a phosphate group, or a nonionic group, such as poly(ethylene oxide), preferably a structure derived from acrylic acid or methacrylic acid. In the pigment dispersing resin (A), anionic groups, such as a carboxy group, are preferably entirely or partly neutralized with a basic compound, such as potassium hydroxide.

The pigment dispersing resin (A) may be a copolymer of a monomer component containing a monomer having a hydrophilic group and a monomer having no hydrophilic group.

The mass ratio [structural unit (z1)/structural unit (z2)] of a structural unit (z1) derived from the monomer having a hydrophobic group to a structural unit (z2) derived from the monomer having a hydrophilic group in the copolymer preferably ranges from 1.0 to 7.5, more preferably 2.0 to 5.0, in order to produce an aqueous pigment dispersion with higher ejection stability and an ink containing the aqueous pigment dispersion.

The copolymer may be a random copolymer or a block copolymer.

More specifically, the copolymer is preferably an acrylic copolymer having an anionic group as a hydrophilic group.

The acrylic copolymer having an anionic group may be an acrylic copolymer having a hydrophilic structure derived from a monomer having an anionic group, such as (meth)acrylic acid, and a hydrophobic structure derived from another ethylenically unsaturated monomer.

The monomer having an anionic group other than (meth)acrylic acid may be a monomer having a sulfonate group or a phosphate group.

Examples of the other ethylenically unsaturated monomer include styrene monomers, such as styrene, α-methylstyrene, β-methylstyrene, 2,4-dimethylstyrene, α-ethylstyrene, α-butylstyrene, α-hexylstyrene, 4-chlorostyrene, 3-chlorostyrene, 3-bromostyrene, 3-nitrostyrene, 4-methoxystyrene, and vinyltoluene, (meth)acrylates with a benzene ring, such as benzyl (meth)acrylate, phenyl (meth)acrylate, phenylethyl (meth)acrylate, phenylpropyl (meth)acrylate, and phenoxyethyl (meth)acrylate, (meth)acrylates such as methyl acrylate, methyl methacrylate, n-propyl acrylate, isopropyl acrylate, n-butyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, ethyl methacrylate, n-butyl methacrylate, 2-methylbutyl methacrylate, pentyl methacrylate, heptyl methacrylate, maleic acid, maleic acid anhydride, and nonyl methacrylate; (meth)acrylates such as 3-ethoxypropyl acrylate, 3-ethoxybutyl acrylate, dimethylaminoethyl acrylate, 2-hydroxyethyl acrylate, 2-hydroxybutyl acrylate, ethyl-α-hydroxymethyl acrylate, dimethylaminoethyl methacrylate, hydroxyethyl methacrylate, and hydroxypropyl methacrylate; mono(meth)acrylates of polyhydric alcohols, such as diethylene glycol, triethylene glycol, poly(ethylene glycol), glycerin, and bisphenol A; dialkyl maleates, such as dimethyl maleate and diethyl maleate, and vinyl acetate. Among these, the ethylenically unsaturated monomer is particularly preferably styrene, α-methylstyrene, or tert-butylstyrene.

The other ethylenically unsaturated monomer may also be a cross-linking ethylenically unsaturated monomer.

Examples of the cross-linking ethylenically unsaturated monomer include glycidyl (meth)acrylate, divinylbenzene, ethylene glycol di(meth)acrylate, propylene glycol di(meth)acrylate, poly(ethylene glycol) di(meth)acrylate, poly(oxyethylene oxypropylene) glycol di(meth)acrylate, and poly(meth)acrylates of polyhydric alcohols, such as tri(meth)acrylates of glycerin alkylene oxide adducts.

A block copolymer of a monomer component containing a monomer having a hydrophilic group and a monomer having no hydrophilic group that can be used as the pigment dispersing resin (A) may be a multicomponent copolymer, such as a binary, ternary, or higher-order copolymer, of one or more monomers having a hydrophilic group and one or more monomers having no hydrophilic group.

More specifically, the pigment dispersing resin (A) may be a copolymer of a styrene monomer and (meth)acrylic acid, for example, a styrene-acrylic acid copolymer, such as a styrene-(meth)acrylic acid copolymer, a styrene-(meth)acrylate-(meth)acrylic acid copolymer, or a (meth)acrylate-(meth)acrylic acid copolymer, or a styrene-(meth)acrylic acid copolymer having an acid group neutralized with a basic compound, such as potassium hydroxide.

The styrene-(meth)acrylic acid copolymer is preferably produced by polymerization of a combination of acrylic acid, methacrylic acid, and a styrene monomer in order to produce an aqueous pigment dispersion having still higher dispersibility with a lower likelihood of causing aggregation or precipitation of pigments.

The styrene-(meth)acrylic acid copolymer may be a random copolymer or a graft copolymer. The graft copolymer may include polystyrene or a copolymer of styrene and a nonionic monomer copolymerizable with styrene as a main chain or a side chain and a copolymer of acrylic acid, methacrylic acid, and another monomer including styrene as a side chain or a main chain.

The styrene-(meth)acrylic acid copolymer is preferably produced from 50% to 90% by mass of a styrene monomer relative to the total amount of monomers. A styrene-(meth)acrylic acid copolymer produced from 65% to 85% by mass of a styrene monomer relative to the total amount of monomers can improve the affinity of the styrene-(meth)acrylic acid copolymer to the pigment (B) and can improve the dispersion and dispersion stability of pigments in an aqueous pigment dispersion. This also results in high print stability of an ink jet recording ink composition.

The acrylic copolymer can be produced by bulk polymerization, solution polymerization, suspension polymerization, or emulsion polymerization of the monomer having an anionic group. If necessary, a traditional polymerization initiator, chain transfer agent (polymerization degree regulator), surfactant, and/or antifoaming agent may be used in the production of the acrylic copolymer.

Examples of the polymerization initiator include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, and butylperoxybenzoate. The amount of the polymerization initiator to be used preferably ranges from 0.1% to 10.0% by mass of the total amount of monomers to be used in the production of the pigment dispersing resin (A).

The pigment dispersing resin (A), such as the acrylic copolymer having an anionic group, preferably has a weight-average molecular weight in the range of 1000 to 20000, more preferably 5000 to 18000, particularly preferably 5500 to 15000. The weight-average molecular weight herein is measured by gel permeation chromatography (GPC) and refers to a polystyrene equivalent molecular weight based on polystyrene standards.

The pigment dispersing resin (A), for example, an acrylic copolymer having an anionic group, such as the styrene-(meth)acrylic acid copolymer, preferably has an acid value in the range of 10 to 400 (mgKOH/g), more preferably 50 to 300 (mgKOH/g), still more preferably 90 to 200, in order to produce an aqueous pigment dispersion with still higher dispersibility. In particular, when the pigment (B) is a cyan pigment, which has poorer dispersibility than other pigments, the pigment dispersing resin (A) preferably has an acid value in the range of 50 to 300 (mgKOH/g), more preferably 90 to 200 (mgKOH/g), particularly preferably 120 to 200 (mgKOH/g), because this can decrease the volume-average particle size of components, such as the cyan pigment, and effectively reduce an increase in the number of coarse particles, thereby providing an aqueous cyan pigment dispersion with particularly high dispersibility.

When the pigment (B) is a pigment other than cyan pigments (for example, a magenta pigment, a yellow pigment, a black pigment, a violet pigment, a green pigment, an orange pigment, a red pigment, etc.), the pigment dispersing resin (A) preferably has an acid value in the range of 10 to 400 (mgKOH/g), more preferably 50 to 300 (mgKOH/g), particularly preferably 90 to 200, because this can decrease the volume-average particle size of components, such as a pigment, and effectively reduce an increase in the number of coarse particles, thereby providing an aqueous pigment dispersion with particularly high dispersibility.

The acid value is determined according to Japanese Industrial Standards "K 0070:1992. Test methods for acid value, saponification value, ester value, iodine value, hydroxyl value and unsaponifiable matter of chemical products" except that tetrahydrofuran is used as a solvent instead of diethyl ether. The acid value refers to the amount of potassium hydroxide (mg) required to completely neutralize 1 g of a pigment dispersing resin.

As described above, the pigment dispersing resin (A), such as the acrylic copolymer, may have a hydrophilic group, for example, an anionic group, such as a carboxy group, neutralized with a basic compound.

Examples of the basic compound include inorganic basic compounds, for example, hydroxides of alkali metals, such as potassium and sodium; carbonates of alkali metals, such as potassium and sodium; carbonates of alkaline-earth metals, such as calcium and barium; and ammonium hydroxide, and organic basic compounds, for example, amino alcohols, such as triethanolamine, N,N-dimethanolamine, N-(aminoethyl)ethanolamine, dimethylethanolamine, and N,N-butyldiethanolamine, morpholines, such as morpholine, N-methylmorpholine, and N-ethylmorpholine, and piperazines, such as N-(2-hydroxyethyl)piperazine and piperazine hexahydrate.

The pigment dispersing resin (A) preferably has a neutralization rate in the range of 80% to 120%. The neutralization rate is represented by the following formula.

Neutralization rate (%)=[(mass of basic compound (g)×56.11×1000)/(acid value of pigment dispersing resin (A) (mgKOH/g)×equivalent amount of basic compound×mass of pigment dispersing resin (A) (g))

The ratio of the mass of the pigment dispersing resin (A) to the total mass of the pigment (B) described later is preferably 1.0 or less, more preferably in the range of 0.01 to 0.5, in order to provide higher dispersibility and storage stability as well as high color developability on plain paper.

The pigment (B) in the present invention has the solubility sphere (b3) defined by the central coordinate ($\delta D^3$, $\delta P^3$, $\delta H^3$) represented by the dispersion term ($\delta D^3$), the polarity term ($\delta P^3$), and the hydrogen bonding term ($\delta H^3$) of the Hansen solubility parameter and the interaction radius (r3).

An aqueous pigment dispersion according to the present invention contains a combination of the particular pigment dispersing resin (A) and the pigment (B), which satisfies the following formula (1).

$$[4\times(\delta D^3-D^1)^2+(\delta P^3-\delta P^1)^2+(\delta H^3-\delta H^1)^2]^{1/2} \leq [r1+r3] \quad (1)$$

When the pigment dispersing resin (A) and the pigment (B) satisfy the formula (1), a combination of the pigment dispersing resin (A) and the pigment (B) is chosen such that the solubility sphere (a1) of the pigment dispersing resin (A) overlaps the solubility sphere (b1) of the pigment (B). The overlap of the solubility spheres indicates a high affinity between the pigment dispersing resin (A) and the pigment (B) and indicates that the pigment dispersing resin (A) is easily adsorbed onto the pigment (B).

The pigment (B) may be a known pigment. More specifically, the pigment (B) may be an inorganic pigment or an organic pigment.

Examples of the inorganic pigment include iron oxide, carbon black manufactured by a known method, such as a contact method, a furnace process, or a thermal process, and titanium oxide.

Examples of the organic pigment include azo pigments (azo lakes, insoluble azo pigments, condensed azo pigments, chelate azo pigments, etc.), polycyclic pigments (for example, phthalocyanine pigments, perylene pigments, perinone pigments, anthraquinone pigments, quinacridone pigments, dioxazine pigments, thioindigo pigments, isoindolinone pigments, quinophthalone pigments, etc.), dye chelates (for example, basic dye chelates, acidic dye chelates, etc.), nitro pigments, nitroso pigments, and aniline black, used alone or in combination. The organic pigment may also be a solid solution.

Examples of carbon black used as the pigment (B) include #2300, #2200B, #990, #900, #960, #980, #33, #40, #45, #45L, #52, HCF88, MA7, MA8, and MA100 manufactured by Mitsubishi Chemical Corporation, Raven 5750, Raven 5250, Raven 5000, Raven 3500, Raven 1255, and Raven 700 manufactured by Columbian Carbon Co., Regal 400R, Regal 330R, Regal 660R, Mogul L, Mogul 700, Monarch 800, Monarch 880, Monarch 900, Monarch 1000, Monarch 1100, Monarch 1300, and Monarch 1400 manufactured by Cabot Corporation, and Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, NIPEX 180, NIPEX 95, NIPEX 90, NIPEX 85, NIPEX 80, and NIPEX 75 manufactured by Orion Engineered Carbons.

Among the pigments (B), examples of the yellow pigment include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Among the pigments (B), examples of the magenta pigment include C.I. Pigment Red 5, 7, 12, 48 (Ca), 48 (Mn), 57 (Ca), 57:1, 112, 122, 123, 146, 150, 168, 176, 184, 185, 202, 209, 213, 269, and 282.

Among the pigments (B), examples of the cyan pigment include C.I. Pigment Blue 1, 2, 3, 15, 15:1, 15:2, 15:3, 15:4, 15:6, 16, 22, 60, 63, and 66.

Among the pigments (B), examples of the orange pigment include C.I. Pigment Orange 5, 13, 16, 17, 34, 36, 43, 51, 64, and 71.

Among the pigments (B), examples of the violet pigment include C.I. Pigment Violet 1, 3, 5:1, 16, 19, 23, and 38.

Among the pigments (B), examples of the green pigment include C.I. Pigment Green 1, 4, 7, 8, 10, 17, 18, and 36.

Among the pigments (B), examples of the red pigment include C.I. Pigment Red 1, 2, 3, 5, 17, 22, 23, 31, 38, 48:2, 48:3, 48:4, 49:1, 52:2, 53:1, 57:1, 60:1, 63:1, 63:2, 64:1, 81, 83, 88, 101, 104, 105, 106, 108, 112, 114, 122, 123, 146, 149, 150, 166, 168, 170, 172, 177, 178, 179, 184, 185, 190, 193, 202, 207, 208, 209, 213, 219, 224, 254, and 264.

The amount of the pigment (B) to be used preferably ranges from 1.0% to 50.0% by mass, more preferably 10.0% to 20.0% by mass, of the total amount of aqueous pigment dispersion.

The pigment (B) preferably has a primary particle size of 25 μm or less. The use of the pigment (B) with a primary particle size of 1 μm or less can result in high pigment dispersibility due to a decreased occurrence of precipitation of the pigment (B) in an aqueous pigment dispersion according to the present invention. The primary particle size is measured, for example, with a transmission electron microscope (TEM).

The pigment (B) preferably has a volume-average particle size of 1 μm or less, more preferably in the range of 10 to 250 nm, particularly preferably 50 to 200 nm, in an aqueous pigment dispersion according to the present invention.

The organic solvent (C) for use in an aqueous pigment dispersion according to the present invention will be described below.

The central coordinate ($\delta D^4$, $\delta P^4$, $\delta H^4$) represented by the dispersion term ($\delta D^4$), the polarity term ($\delta P^4$), and the hydrogen bonding term ($\delta H^4$) of the Hansen solubility parameter of the organic solvent (C) satisfies the formula (4) and at least one of the following formulae (2) and (3).

$$[4\times(\delta D^4-\delta D^1)^2+(\delta P^4-\delta P^1)^2+(\delta H^4-\delta H^1)^2]^{1/2} \leq r1 \quad (2)$$

$$[4\times(\delta D^4-\delta D^3)^2+(P^4-P^3)^2+(\delta H^4-\delta H^3)^2]^{1/2} \leq r3 \quad (3)$$

$$[4\times(\delta D^4-\delta D^2)^2+(\delta P^4-\delta P^2)^2+(\delta H^4-\delta H^2)^2]^{1/2} \geq r2 \quad (4)$$

Satisfying the formula (2) indicates that the organic solvent (C) and the pigment dispersing resin (A) are used in combination such that the central coordinate ($\delta D^4$, $\delta P^4$, $\delta H^4$) of the organic solvent (C) is located within the solubility sphere (a1) of the pigment dispersing resin (A). The selection of the pigment dispersing resin (A) and the organic solvent (C) combined such that the central coordinate ($\delta D^4$, $\delta P^4$, $\delta H^4$) is located within the solubility sphere (a1) forms a reverse micellar structure in which the adsorption site of the pigment dispersing resin (A) toward the pigment (B) faces outward, thereby improving the adsorption efficiency of the pigment dispersing resin (A) on the pigment (B).

Satisfying the formula (3) indicates that the organic solvent (C) and the pigment (B) are used in combination such that the central coordinate ($\delta D^4$, $\delta P^4$, $\delta H^4$) of the organic solvent (C) is located within the solubility sphere (b3) of the pigment (B). The selection of the pigment (B) and the organic solvent (C) combined such that the central coordinate ($\delta D^4$, $\delta P^4$, $\delta H^4$) is located within the solubility sphere (b3) improves the wettability of the pigment (B). The selection of the pigment (B) and the organic solvent (C) combined such that the central coordinate ($\delta D^4$, $\delta P^4$, $\delta H^4$) is close to the central coordinate of the solubility sphere (b3) further improves the wettability of the pigment (B), decreases the size of aggregates of the pigment (B), and increases the amount of the pigment dispersing resin (A) adsorbed on the pigment (B) This facilitates the production of an aqueous pigment dispersion that can be used to produce an ink with high ejection stability and long-term storage stability and that has high dispersibility with a lower likelihood of causing aggregation or precipitation of pigments.

The organic solvent (C) satisfies at least one of the formulae (2) and (3) and preferably satisfies the formulae (2) and (3) to improve adsorption of the pigment dispersing resin (A) on the surface of the pigment (B).

The organic solvent (C) not only satisfies at least one of the formulae (2) and (3) but also satisfies the formula (4).

Satisfying the formula (4) indicates that the organic solvent (C) and the pigment dispersing resin (A) are used in combination such that the central coordinate ($\delta D^4$, $\delta P^4$, $\delta H^4$) of the organic solvent (C) is not located within the solubility sphere (a2) of the pigment dispersing resin (A). The selection of the pigment dispersing resin (A) and the organic solvent (C) combined such that the central coordinate ($\delta D^4$, $\delta P^4$, $\delta H^4$) is not located within the solubility sphere (a2) forms a reverse micellar structure in which the adsorption site of the pigment dispersing resin (A) toward the pigment (B) faces outward, thereby improving the adsorption efficiency of the pigment dispersing resin (A) on the pigment (B).

When the pigment (B) is one or more selected from the group consisting of cyan pigments, magenta pigments, yellow pigments, black pigments, violet pigments, green pigments, orange pigments, and red pigments, the organic solvent (C) is preferably used in combination such that the central coordinate ($\delta D^4$, $\delta P^4$, $\delta H^4$) represented by the dispersion term ($\delta D^4$), the polarity term ($\delta P^4$), and the hydrogen bonding term ($\delta H^4$) of the Hansen solubility parameter of the organic solvent (C) satisfies all the formulae (2), (3), and (4), in order to produce an aqueous pigment dispersion having high dispersibility with a lower likelihood of causing aggregation or precipitation of pigments.

Specific examples of the organic solvent (C) include ketones, such as acetone, methyl ethyl ketone, methyl butyl ketone, and methyl isobutyl ketone, alcohols, such as methanol, ethanol, 2-propanol, 2-methyl-1-propanol, 1-butanol, and 2-methoxyethanol, ethers, such as tetrahydrofuran, 1,4-dioxane, and 1,2-dimethoxyethane, amides, such as dimethylformamide and N-methylpyrrolidone, glycols, such as ethylene glycol, diethylene glycol, triethylene glycol, tetraethylene glycol, propylene glycol, poly(ethylene glycol), and poly(propylene glycol); diols, such as butanediol, pentanediol, hexanediol, and their homologues; glycol esters, such as propylene glycol laurate; glycol ethers, such as ethers of diethylene glycol monoethyl, diethylene glycol monobutyl, and diethylene glycol monohexyl, propylene glycol ether, dipropylene glycol ether, and cellosolves including triethylene glycol ether; alcohols, such as methanol, ethanol, isopropyl alcohol, 1-propanol, 2-propanol, 1-butanol, 2-butanol, butyl alcohol, pentyl alcohol, and their homologues; sulfolane; lactones, such as γ-butyrolactone; lactams, such as N-(2-hydroxyethyl)pyrrolidone and 2-pyrrolidone; glycerin and glycerin derivatives, such as polyoxyalkylene adducts of glycerin; and other various solvents known as water-soluble organic solvents, used alone or in combination.

As a combination of the pigment dispersing resin (A), the pigment (B), and the organic solvent (C), for example, when the pigment (B) is a cyan pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.2 to 0.5, and the organic solvent (C) is preferably dipropylene glycol, N-methylpyrrolidone, 2-pyrrolidone, tetrahydrofuran, 1,2-hexanediol, or a mixed solvent of N-methylpyrrolidone and methanol, more preferably a mixed solvent of 2-pyrrolidone and dipropylene glycol. The volume ratio of N-methylpyrrolidone to methanol and the volume ratio of 2-pyrrolidone to dipropylene glycol preferably range from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a magenta pigment, the pigment dispersing resin (A) is preferably a styrene-(meth)acrylic acid copolymer with an acid value in the range of 90 to 200, the mass ratio of the pigment dispersing resin (A) to the pigment (B) being in the range of 0.1 to 0.5, and the organic solvent (C) is preferably dipropylene glycol, N-methylpyrrolidone, or a mixed solvent of tetrahydrofuran and methanol, more preferably a mixed solvent of 2-pyrrolidone and dipropylene glycol. The volume ratio of tetrahydrofuran to methanol and the volume ratio of 2-pyrrolidone to dipropylene glycol preferably range from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a yellow pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.1 to 0.5, and the organic solvent (C) is preferably methyl ethyl ketone, acetonitrile, propylene glycol, or N-methylpyrrolidone, more preferably a mixed solvent of 2-pyrrolidone and dipropylene glycol. The volume ratio of 2-pyrrolidone to dipropylene glycol preferably ranges from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a black pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.2 to 0.7, and the organic solvent (C) is preferably 2-pyrrolidone, N-methylpyrrolidone, methyl ethyl ketone, or dimethylformamide, more preferably 2-pyrrolidone.

As a combination of the pigment dispersing resin (A), the pigment (B), and the organic solvent (C), for example, when the pigment (B) is an orange pigment, the pigment dispersing resin (A) is preferably a styrene-(meth)acrylic acid copolymer with an acid value in the range of 90 to 180, the mass ratio of the pigment dispersing resin (A) to the pigment (B) being in the range of 0.1 to 0.5, and the organic solvent (C) is preferably tetrahydrofuran, a mixed solvent of 2-pyrrolidone and dipropylene glycol, a mixed solvent of N-methylpyrrolidone and dipropylene glycol, or 2-pyrrolidone, more preferably 2-pyrrolidone.

The volume ratio of N-methylpyrrolidone to dipropylene glycol and the volume ratio of 2-pyrrolidone to dipropylene glycol preferably range from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a violet pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.2 to 0.5, and the organic solvent (C) is preferably N-methylpyrrolidone, 2-pyrrolidone, or isopropanol, more preferably a mixed solvent of 2-pyrrolidone and dipropylene glycol. The volume ratio of 2-pyrrolidone to dipropylene glycol preferably ranges from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a green pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.1 to 0.5, and the organic solvent (C) is preferably dipropylene glycol, N-methylpyrrolidone, isopropanol, or 1,2-hexanediol, more preferably a mixed solvent of 2-pyrrolidone and dipropylene glycol. The volume ratio of 2-pyrrolidone to dipropylene glycol preferably ranges from 9:1 to 1:9, more preferably 3:7 to 7:3, particularly preferably 4:6 to 6:4.

As a combination of the pigment dispersing resin (A), the pigment (B), and the organic solvent (C), for example, when the pigment (B) is a red pigment, the pigment dispersing resin (A) is preferably a styrene-(meth)acrylic acid copolymer with an acid value in the range of 120 to 200, the mass ratio of the pigment dispersing resin (A) to the pigment (B) being in the range of 0.1 to 0.5, and the organic solvent (C) is preferably dipropylene glycol, isopropanol, or 1,2-hexanediol, more preferably a mixed solvent of 2-pyrrolidone and dipropylene glycol. The volume ratio of 2-pyrrolidone to dipropylene glycol preferably ranges from 9:1 to 1:9, more preferably 3:7 to 7:3, particularly preferably 4:6 to 6:4.

In the production of the aqueous pigment dispersion, it is preferable to increase the wettability of the pigment (B) to the pigment dispersing resin (A) and solubility. The organic solvent (C) increases the wettability to the pigment (B) and the pigment dispersing resin (A) and solubility.

The pigment dispersing resin (A) and the pigment (B) in the aqueous pigment dispersion may be of various types. For example, the physical properties of the pigment (B) vary with the pigmentation method or surface treatment, and the Hansen solubility parameter (HSP) also varies accordingly.

The pigment dispersing resin (A) may be produced from various monomers, and the HSP of the pigment dispersing resin (A) varies with the selected monomer.

Thus, to select the organic solvent (C) appropriate to increase the wettability of the pigment (B) and the pigment dispersing resin (A) and solubility, much trial and error is required to select the organic solvent (C) from an enormous number of alternatives.

In an aqueous pigment dispersion according to the present invention, a combination of the pigment dispersing resin (A), the pigment (B), and the organic solvent (C) can be chosen on the basis of the solubility spheres of the Hansen solubility parameters to efficiently produce an aqueous pigment dispersion optimum for achieving the objects.

The organic solvent (C) is preferably an organic solvent within the solubility sphere (a1) of the pigment dispersing resin (A) or the solubility sphere (b3) of the pigment (B). The organic solvent (C) is preferably an organic solvent other than the organic solvents contained in the solubility sphere (a2) of the pigment dispersing resin (A). For the organic solvents within the solubility sphere (a2) of the pigment dispersing resin (A), the adsorption site of the pigment dispersing resin (A) toward the pigment (B) tends to face inward, which is undesirable to promote adsorption on the pigment (B) and sometimes increases the number of coarse particles in the aqueous pigment dispersion.

The total amount of the organic solvent (C) preferably ranges from 0.1 to 3.0, more preferably 0.4 to 2.0, times (mass ratio) the total amount of the pigment (B) in terms of higher dispersibility and storage stability.

The water (D) for use in an aqueous pigment dispersion according to the present invention may be pure water or ultrapure water, for example, ion-exchanged water, ultrafiltered water, reverse osmosis water, or distilled water. Use of water sterilized, for example, by ultraviolet irradiation or by the addition of hydrogen peroxide can advantageously prevent the generation of mold or bacteria in aqueous pigment dispersions and inks containing the aqueous pigment dispersions during long-term storage. The total amount of the water (D) preferably ranges from 1 to 100 times (mass ratio) the total amount of the pigment (B) in terms of higher dispersibility and storage stability.

A method for producing an aqueous pigment dispersion according to the present invention will be described below.

An aqueous pigment dispersion according to the present invention can be produced by mixing the pigment dispersing resin (A), the pigment (B), the organic solvent (C), and water (D), for example, by a wet dispersion method or a kneading dispersion method, preferably by a wet dispersion method for higher dispersibility.

A combination of the pigment dispersing resin (A) and the pigment (B) is chosen to satisfy the formula (1), and the organic solvent (C) is chosen such that the central coordinate ($\delta D^4$, $\delta P^4$, $\delta H^4$) of the organic solvent (C) satisfies the formula (4) and at least one of the formulae (2) and (3).

The wet dispersion method may include supplying the pigment dispersing resin (A), the pigment (B), and other optional components to a solvent, such as an aqueous medium or the organic solvent (C), and dispersing the pigment (B) in the aqueous medium. If necessary, a paint conditioner may be used for the mixing.

The kneading dispersion method may include the step of kneading the pigment dispersing resin (A), the pigment (B), the organic solvent (C), and, if necessary, a basic compound in a kneader to produce a mixture and the step of mixing the mixture with water.

First, the pigment dispersing resin (A), the pigment (B), the organic solvent (C), and, if necessary, a basic compound are supplied to a container to produce a mixture.

In the step of producing the mixture, the pigment dispersing resin (A), the pigment (B), and the organic solvent (C), and, if necessary, a basic compound may be supplied in any order. All the components may be simultaneously supplied before kneading, or each component may be supplied little by little.

In the step of producing the mixture, for example, a kneader may be used. Examples of the kneader include media mill dispersion methods using media, such as paint conditioners, bead mills, sand mills, and ball mills; media-less dispersion methods using ultrasonic homogenizers, high-pressure homogenizers, Nanomizer, and Ultimizer; and rolling mills, Henschel mixers, pressure kneaders, intensive mixers, Banbury mixers, planetary mixers, and Trimix. Among these, the kneader preferably has a mixing vessel and impeller blades, and the mixing vessel can be closed.

Such an apparatus may be a Henschel mixer, a pressure kneader, a Banbury mixer, a planetary mixer, or Trimix. In particular, a planetary mixer is preferred.

In the step of dispersing the mixture produced by the method in water (D), for example, when a kneader including a closable mixing vessel and impeller blades is used in the kneading step, the water (D) can be supplied to and mixed with the mixture after the kneading step to disperse the mixture in the water (D).

The aqueous pigment dispersion produced by the method may be subjected to dispersion treatment in a dispersing apparatus. Examples of the dispersing apparatus include paint conditioners, bead mills, rolling mills, sand mills, ball mills, attritors, basket mills, sand mills, sand grinders, Dyno-Mill, Dispermat, SC Mill, spike mills, agitator mills, juice mixers, high-pressure homogenizers, ultrasonic homogenizers, Nanomizer, dissolvers, Disper mixers, high-speed impeller dispersing apparatuses, kneaders, planetary mixers, and Trimix.

Known dispersing apparatuses may be used in the dispersing step. Examples of such dispersing apparatuses with media include paint shakers, ball mills, nano mills, attritors, basket mills, sand mills, sand grinders, Dyno-Mill, Dispermat, SC Mill, spike mills, and agitator mills. Examples of such dispersing apparatuses without media include ultrasonic homogenizers, high-pressure homogenizers, Nanomizer, dissolvers, Disper mixers, rolling mills, Henschel mixers, pressure kneaders, intensive mixers, Banbury mixers, planetary mixers, and Trimix. These may be used alone or in combination. Among these, dispersing apparatuses with media are preferred due to their high dispersing ability.

An aqueous pigment dispersion produced by the method preferably has a volume-average particle size in the range of 10 to 250 nm, most preferably 50 to 200 nm, in order to produce an aqueous pigment dispersion and an ink with high dispersibility and storage stability as well as printed materials with high color developability.

The aqueous pigment dispersion can be diluted to any concentration and can be used for printing inks, such as offset inks, gravure inks, flexographic inks, and silkscreen inks, and ink jet recording inks.

An ink jet recording ink can be produced by mixing the aqueous pigment dispersion and, if necessary, a water-soluble solvent, water, a resin, such as an acrylic resin or a polyurethane resin, and additive agents, such as a drying control chemical additive, a penetrant, and/or a surfactant.

Preferably, the drying control chemical additive is miscible with the water (D) and has an effect of preventing the clogging of an ink jet printer head. Examples of the drying control chemical additive include glycerin, ethylene glycol, diethylene glycol, triethylene glycol, triethylene glycol mono-n-butyl ether, poly(ethylene glycol)s with a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, meso-erythritol, and pentaerythritol. Among these, the drying control chemical additive is preferably glycerin or triethylene glycol in order to improve safety and impart good drying and ejection performance to the ink. The drying control chemical additive preferably constitutes 3% to 50% by mass of the total amount of ink.

Examples of the penetrant include lower alcohols, such as ethanol and isopropyl alcohol; and glycol monoethers of alkyl alcohols, such as ethylene glycol hexyl ether, diethylene glycol butyl ether, and propylene glycol propyl ether. The penetrant preferably constitutes 0.01% to 10% by mass of the total amount of ink in order to improve the penetrability of the ink into recording media and adjust the ink dot size on recording media.

Examples of the surfactant include anionic surfactants, nonionic surfactants, cationic surfactants, and amphoteric surfactants. Anionic surfactants and nonionic surfactants are preferred in order to adjust ink characteristics, such as surface tension.

Examples of the anionic surfactants include alkylbenzene sulfonates, alkylphenyl sulfonates, alkylnaphthalene sulfonates, higher fatty acid salts, sulfate ester salts of higher fatty acid esters, sulfonates of higher fatty acid esters, sulfate ester salts and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates. Specific examples of these anionic surfactants include dodecylbenzene sulfonate, isopropylnaphthalene sulfonate, monobutylphenylphenol monosulfonate, monobutylbiphenyl sulfonate, and dibutylphenylphenol disulfonate.

Examples of the nonionic surfactants include polyoxyethylene alkyl ethers, polyoxyethylene alkylphenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylol amides, alkylalkanolamides, acetylenic glycol, acetylenic glycol oxyethylene adducts, and poly(ethylene glycol) poly(propylene glycol) block copolymers. Among these, preferred are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylol amides, acetylenic glycol, acetylenic glycol oxyethylene adducts, and poly(ethylene glycol) poly(propylene glycol) block copolymers.

Examples of other surfactants include silicone surfactants, such as polysiloxane oxyethylene adducts; fluorinated surfactants, such as perfluoroalkyl carboxylates, perfluoroalkyl sulfonates, and oxyethylene perfluoroalkyl ethers; and biosurfactants, such as spiculisporic acid, rhamnolipid, and lysolecithin.

The surfactant preferably constitutes 0.001% to 2% by mass, more preferably 0.001% to 1.5% by mass, still more preferably 0.01% to 1% by mass, of the total mass of ink, in order to more effectively prevent blurring of print images.

If necessary, other additive agents, such as a preservative, a viscosity modifier, a pH-adjusting agent, a chelating agent, a plasticizer, an antioxidant, and/or an ultraviolet absorber, may be added.

Recording Media Water-based inks for ink jet recording can be used for printing on various recording media. Examples of the recording media include absorptive recording media, such as copy paper generally used for copying machine (PPC paper), recording media with an ink absorbing layer, non-absorptive recording media without ink absorbency, and less-absorptive recording media with low ink absorbency.

EXAMPLES

Preparation of Pigment Dispersing Resin A 2 parts by mass of resin a, 0.4 parts by mass of potassium hydroxide, and 10.0 parts by mass of ion-exchanged water were mixed to produce an aqueous solution of a pigment dispersing resin A in which the neutralization rate of the acid group of the resin a was 100%. The resin a was a radical polymerization product of 72.0 parts by mass of styrene, 12.1 parts by mass of acrylic acid, 15.8 parts by mass of methacrylic acid, and 0.1 parts by mass of n-butyl acrylate. The resin a had a weight-average molecular weight of 8200 and an acid value of 180 mgKOH/g. In the resin a, the mass ratio [structural unit (z1)/structural unit (z2)] of a structural unit (z1) derived from a monomer having a hydrophobic group to a structural unit (z2) derived from a monomer having a hydrophilic group was 2.6. The resin a was a powder 1 mm or less in diameter.

Preparation of Pigment Dispersing Resin B 2 parts by mass of a resin b, 0.2 parts by mass of potassium hydroxide, and 10.0 parts by mass of ion-exchanged water were mixed to produce an aqueous solution of a pigment dispersing resin B in which the neutralization rate of the acid group of the resin b was 100%. The resin b was a radical polymerization product of 83.0 parts by mass of styrene, 7.4 parts by mass of acrylic acid, 9.6 parts by mass of methacrylic acid, and 0.1 parts by mass of n-butyl acrylate. The resin b had a weight-average molecular weight of 11000 and an acid value of 120 mgKOH/g. The mass ratio [structural unit (z1)/structural unit (z2)] in the resin b was 4.9. The resin b was a powder 1 mm or less in diameter.

Preparation of Pigment Dispersing Resin C 2 parts by mass of a resin c, 0.4 parts by mass of potassium hydroxide, and 10.0 parts by mass of ion-exchanged water were mixed to produce an aqueous solution of a pigment dispersing resin C in which the neutralization rate of the acid group of the resin c was 100%. The resin c was a radical polymerization product of 72.0 parts by mass of styrene, 12.1 parts by mass of acrylic acid, 15.8 parts by mass of methacrylic acid, and 0.1 parts by mass of n-butyl acrylate. The resin c had a weight-average molecular weight of 11000 and an acid value of 180 mgKOH/g. The mass ratio [structural unit (z1)/structural unit (z2)] in the resin c was 2.6. The resin c was a powder 1 mm or less in diameter.

Preparation of Pigment Dispersing Resin D 2 parts by mass of a resin d, 0.3 parts by mass of potassium hydroxide, and 10.0 parts by mass of ion-exchanged water were mixed to produce an aqueous solution of a pigment dispersing resin D in which the neutralization rate of the acid group of the resin d was 100%. The resin d was a radical polymerization product of 76.9 parts by mass of styrene, 10.0 parts by mass of acrylic acid, 13.0 parts by mass of methacrylic acid, and 0.1 parts by mass of n-butyl acrylate. The resin d had a weight-average molecular weight of 8800 and an acid value of 150 mgKOH/g. The mass ratio [structural unit (z1)/structural unit (z2)] in the resin d was 3.4. The resin d was a powder 1 mm or less in diameter.

Preparation of Pigment Dispersing Resin E 2 parts by mass of a resin e, 0.3 parts by mass of potassium hydroxide, and 10.0 parts by mass of ion-exchanged water were mixed to produce an aqueous solution of a pigment dispersing resin E in which the neutralization rate of the acid group of the resin e was 100%. The resin e was a radical polymerization product of 76.9 parts by mass of styrene, 10.0 parts by mass of acrylic acid, 13.0 parts by mass of methacrylic acid, and 0.1 parts by mass of n-butyl acrylate. The resin e had a weight-average molecular weight of 11000 and an acid value of 150 mgKOH/g. The mass ratio [structural unit (z1)/structural unit (z2)] in the resin e was 3.4. The resin e was a powder 1 mm or less in diameter.

The weight-average molecular weight in the present invention is measured by gel permeation chromatography (GPC) and refers to a polystyrene equivalent molecular weight based on polystyrene standards. The following apparatuses and conditions were employed in the measurements.

Liquid pump: LC-9A
System controller: SLC-6B
Autoinjector: S1L-6B
Detector: RID-6A
each manufactured by Shimadzu Corporation
Data processing software: Sic480II data station (manufactured by System Instruments Co., Ltd.).
Column: GL-R400 (guard column)+GL-R440+GL-R450+GL-R400M (manufactured by Hitachi Chemical Co., Ltd.)
Eluting solvent: tetrahydrofuran (THF)
Eluting flow rate: 2 mL/min
Column temperature: 35° C.

The Hansen solubility parameters of the pigment dispersing resins A to E were determined by the following method.

The aqueous solution of the pigment dispersing resin A was dried in a circulating air dryer at 130° C. to produce the pigment dispersing resin A with a solid content of 100% as a potassium salt.

Subsequently, 9.95 g of each of 25 organic solvents listed in Table 1 and 0.05 g of the pigment dispersing resin A were mixed by shaking for 30 minutes to prepare 25 compositions with the concentration of the pigment dispersing resin A being 0.5% by mass.

25 compositions were prepared in the same manner except that the aqueous solution of the pigment dispersing resin A was replaced with each aqueous solution of the pigment dispersing resins B to E. The concentration of the pigment dispersing resin in each composition was 0.5% by mass.

TABLE 1

| Table 1 | Dispersion term ($\delta D^4$) | Polarity term ($\delta P^4$) | Hydrogen bonding term ($\delta H^4$) |
| --- | --- | --- | --- |
| Methyl ethyl ketone | 16.0 | 9.0 | 5.1 |
| Acetonitrile | 15.3 | 18.0 | 6.1 |
| N-methylpyrrolidone | 18.0 | 12.3 | 7.2 |
| Tetrahydrofuran | 16.8 | 5.7 | 8.0 |
| 2-pyrrolidone | 18.2 | 12.0 | 9.0 |
| Triethylene glycol monoethyl ether | 16.2 | 7.1 | 10.8 |
| Triethylene glycol monobutyl ether | 16.1 | 6.2 | 10.9 |
| Dimethylformamide | 17.4 | 13.7 | 11.3 |
| Diethylene glycol monoethyl ether | 16.1 | 9.2 | 12.2 |
| 1:1 (volume ratio) mixed solvent of 2-pyrrolidone and dipropylene glycol | 17.6 | 10.2 | 12.5 |
| 1:1 (volume ratio) mixed solvent of N-methylpyrrolidone and methanol | 16.4 | 12.3 | 14.8 |
| 1:1 (volume ratio) mixed solvent of tetrahydrofuran and methanol | 15.8 | 9.0 | 15.2 |
| Isopropanol | 15.8 | 6.1 | 16.4 |
| 1,2-hexanediol | 16.5 | 6.7 | 17.1 |
| Dipropylene glycol | 17.0 | 8.4 | 15.9 |
| 1:2 (volume ratio) mixed solvent of water and acetonitrile | 15.4 | 17.3 | 18.2 |
| Triethylene glycol | 16.0 | 12.5 | 18.6 |
| Propylene glycol | 16.8 | 10.4 | 21.3 |
| Methanol | 14.7 | 12.3 | 22.3 |
| 1:4 (volume ratio) mixed solvent of water and methanol | 14.9 | 13.0 | 26.3 |
| 1:2 (volume ratio) mixed solvent of water and methanol | 15.0 | 14.0 | 28.0 |
| 1:1 (volume ratio) mixed solvent of water and methanol | 15.1 | 14.2 | 32.3 |
| 2:1 (volume ratio) mixed solvent of water and methanol | 15.2 | 14.8 | 35.6 |
| 4:1 (volume ratio) mixed solvent of water and methanol | 15.3 | 15.3 | 38.3 |
| Water | 15.5 | 16.0 | 42.3 |

The dispersion term ($\delta D^1$), polarity term ($\delta P^1$), and hydrogen bonding term ($\delta H^1$) of each organic solvent in Table 1 are described in the computer software Hansen Solubility Parameters in Practice 4th Edition 4.1.07 (HSPiP).

The compositions were then left standing at 25° C. for 24 hours.

After standing, the compositions were visually inspected. Organic solvents in compositions without precipitates were classified as "good solvents", and organic solvents in compositions with precipitates were classified as "poor solvents".

The compound names of the 25 organic solvents and their classes (good solvent or poor solvent) were input into the computer software Hansen Solubility Parameters in Practice 4th Edition 4.1.07 (HSPiP) to determine the Hansen solubility parameters of the pigment dispersing resins A to E, which were defined by the solubility sphere (a1) and the solubility sphere (a2). The solubility sphere (a1) was defined by the central coordinate ($\delta D^1$, $\delta P^1$, $\delta H^1$) represented by the dispersion term ($\delta D^1$), polarity term ($\delta P^1$), and hydrogen bonding term ($\delta H^1$) of the Hansen solubility parameter and the interaction radius (r1). The solubility sphere (a2) was defined by the central coordinate ($\delta D^2$, $\delta P^2$, $\delta H^2$) represented by the dispersion term ($\delta D^2$), polarity term ($\delta P^2$), and hydrogen bonding term ($\delta H^2$) of the Hansen solubility parameter and the interaction radius (r2). In a comparison between the hydrogen bonding term ($\delta H^1$) and the hydrogen bonding term ($\delta H^2$), the solubility sphere (a2) with a large hydrogen bonding term was determined to be the solubility sphere derived from the hydrophilic structure, and the solubility sphere (a1) with a small hydrogen bonding term was determined to be the solubility sphere derived from the hydrophobic structure.

TABLE 2

| Table 2 | $\delta D^1$ | $\delta P^1$ | $\delta H^1$ | r1 | $\delta D^2$ | $\delta P^2$ | $\delta H^2$ | r2 |
| --- | --- | --- | --- | --- | --- | --- | --- | --- |
| Pigment dispersing resin A | 17.5 | 9.6 | 10.8 | 5.8 | 15.9 | 15.7 | 30.3 | 12.2 |
| Pigment dispersing resin B | 18.1 | 8.1 | 11.2 | 7.1 | 14.5 | 15.8 | 25.2 | 7.9 |
| Pigment dispersing resin C | 16.1 | 9.3 | 12.6 | 4.8 | 15.6 | 17.2 | 29.5 | 12.5 |
| Pigment dispersing resin D | 17.5 | 7.7 | 11.3 | 6.3 | 15.8 | 16.4 | 27.8 | 11.0 |
| Pigment dispersing resin E | 17.2 | 9.9 | 11.5 | 6.1 | 15.3 | 16.7 | 29.7 | 12.4 |

Pigment

The following pigments were used.

Cyan pigment: FASTOGEN BLUE TGR-SD manufactured by DIC

Magenta pigment: FASTOGEN SUPER MAGENTA RY manufactured by DIC

Yellow pigment: Fast Yellow 7413 manufactured by Sanyo Color Works, Ltd.

Violet pigment: PV Fast Violet RL manufactured by Clariant AG

Green pigment: FASTOGEN GREEN 2YK manufactured by DIC

Red pigment: Paliogen Red K3580 manufactured by BASF

Orange pigment: Orange A-76 manufactured by Arimoto Chemical Co., Ltd., the primary particle size of which was decreased to 150 nm or less by salt milling Black pigment: #960 manufactured by Mitsubishi Chemical Corporation The Hansen solubility parameters of these pigments were determined by the following method.

First, 9.99 g of each of 16 organic solvents described later and 0.01 g of a pigment (B) were mixed by shaking for 30 minutes to prepare 16 compositions with the concentration of the pigment (B) being 0.1% by mass.

TABLE 3

| Table 3 | Dispersion term ($\delta D^4$) | Polarity term ($\delta P^4$) | Hydrogen bonding term ($\delta H^4$) |
| --- | --- | --- | --- |
| Methyl ethyl ketone | 16.0 | 9.0 | 5.1 |
| Acetonitrile | 15.3 | 18.0 | 6.1 |
| N-methylpyrrolidone | 18.0 | 12.3 | 7.2 |
| Tetrahydrofuran | 16.8 | 5.7 | 8.0 |

TABLE 3-continued

| Table 3 | Dispersion term ($\delta D^4$) | Polarity term ($\delta P^4$) | Hydrogen bonding term ($\delta H^4$) |
|---|---|---|---|
| 2-pyrrolidone | 18.2 | 12.0 | 9.0 |
| Triethylene glycol monoethyl ether | 16.2 | 7.1 | 10.8 |
| Triethylene glycol monobutyl ether | 16.1 | 6.2 | 10.9 |
| Dimethylformamide | 17.4 | 13.7 | 11.3 |
| Diethylene glycol monoethyl ether | 16.1 | 9.2 | 12.2 |
| Isopropanol | 15.8 | 6.1 | 16.4 |
| 1,2-hexanediol | 16.5 | 6.7 | 17.1 |
| Dipropylene glycol | 17.0 | 8.4 | 15.9 |
| Triethylene glycol | 16.0 | 12.5 | 18.6 |
| Propylene glycol | 16.8 | 10.4 | 21.3 |
| Methanol | 14.7 | 12.3 | 22.3 |
| Water | 15.5 | 16.0 | 42.3 |

The dispersion term ($\delta D^1$), polarity term ($\delta P^1$), and hydrogen bonding term ($\delta H^1$) of each organic solvent in Table 3 are described in the computer software Hansen Solubility Parameters in Practice 4th Edition 4.1.07 (HSPiP).

The compositions were then left standing at 25° C. for 24 hours.

After standing, the compositions were visually inspected. An organic solvent in a composition in which 50% or more by mass of the total amount of pigment in the composition precipitated was classified as a "poor solvent", and an organic solvent in a composition in which no pigment or less than 50% by mass of the total amount of pigment precipitated was classified as a "good solvent".

The compound names of the 16 organic solvents and their classes (good solvent or poor solvent) were input into the computer software Hansen Solubility Parameters in Practice 4th Edition 4.1.07 (HSPiP) to determine the Hansen solubility parameters of the pigments defined by the solubility sphere (b3), which was defined by the central coordinate ($\delta D^3$, $\delta P^3$, $\delta H^3$) represented by the dispersion term ($\delta D^3$), polarity term ($\delta P^3$), and hydrogen bonding term ($\delta H^3$) of the Hansen solubility parameter and interaction radius (r1).

TABLE 4

| Table 4 | Dispersion term ($\delta D^3$) | Polarity term ($\delta P^3$) | Hydrogen bonding term ($\delta H^3$) | Interaction radius (r3) |
|---|---|---|---|---|
| Cyan pigment | 17.4 | 11.6 | 16.2 | 5.3 |
| Magenta pigment | 16.8 | 10.4 | 14.4 | 4.7 |
| Yellow pigment | 20.9 | 14.8 | 9.1 | 11.9 |
| Violet pigment | 17.7 | 15.1 | 13.4 | 6.8 |
| Green pigment | 17.7 | 10.0 | 8.5 | 4.7 |
| Red pigment | 21.0 | 15.7 | 15.7 | 10.8 |
| Orange pigment | 20.7 | 7.3 | 12.8 | 9.3 |
| Black pigment | 16.6 | 11.7 | 8.0 | 4.2 |

Example 1

10 parts by mass of a cyan pigment listed in Table 4, 10 parts by mass of a 1:1 (volume ratio) mixed solvent of 2-pyrrolidone and dipropylene glycol, the aqueous solution of the pigment dispersing resin A, ion-exchanged water, and 400 parts by mass of zirconia beads 1.25 mm in diameter in a 250-mL container were shook for 3 hours in a paint conditioner (trade name: paint conditioner (test dispersing apparatus), Toyo Seiki Seisaku-Sho, Ltd.). The aqueous solution of the pigment dispersing resin A contained the pigment dispersing resin A produced from 1 part by mass of the resin a before neutralization. The amount of the ion-exchanged water was such that the amount of the ion-exchanged water in a mixture of the aqueous solution of the pigment dispersing resin A and the ion-exchanged water was 10 parts by mass.

After the shaking, the aqueous solution of the pigment dispersing resin A containing 1 part by mass of the pigment dispersing resin A was supplied. Ion-exchanged water was then added such that the concentration of pigment was 16% by mass of the total amount of the mixture before shaking for 1 hour. After the shaking, zirconia beads were filtered off to produce an aqueous pigment dispersion.

Example 2

An aqueous pigment dispersion was produced in the same manner as in Example 1 except that the 1:1 (volume ratio) mixed solvent of 2-pyrrolidone and dipropylene glycol was replaced with 2-pyrrolidone.

Example 3

An aqueous pigment dispersion was produced in the same manner as in Example 1 except that the 1:1 (volume ratio) mixed solvent of 2-pyrrolidone and dipropylene glycol was replaced with dipropylene glycol.

Example 4

An aqueous pigment dispersion was produced in the same manner as in Example 1 except that the 1:1 (volume ratio) mixed solvent of 2-pyrrolidone and dipropylene glycol was replaced with a 1:1 (volume ratio) mixed solvent of 2-pyrrolidone and propylene glycol and the aqueous solution of the pigment dispersing resin A was replaced with the aqueous solution of the pigment dispersing resin B.

Example 5

An aqueous pigment dispersion was produced in the same manner as in Example 1 except that the 1:1 (volume ratio) mixed solvent of 2-pyrrolidone and dipropylene glycol was replaced with 2-pyrrolidone and the aqueous solution of the pigment dispersing resin A was replaced with the aqueous solution of the pigment dispersing resin B.

Example 6

An aqueous pigment dispersion was produced in the same manner as in Example 1 except that the 1:1 (volume ratio) mixed solvent of 2-pyrrolidone and dipropylene glycol was replaced with dipropylene glycol and the aqueous solution of the pigment dispersing resin A was replaced with the aqueous solution of the pigment dispersing resin B.

Example 7

An aqueous pigment dispersion was produced in the same manner as in Example 1 except that the 1:1 (volume ratio) mixed solvent of 2-pyrrolidone and dipropylene glycol was replaced with N-methylpyrrolidone and the aqueous solution of the pigment dispersing resin A was replaced with the aqueous solution of the pigment dispersing resin B.

Example 8

An aqueous pigment dispersion was produced in the same manner as in Example 1 except that the 1:1 (volume ratio)

mixed solvent of 2-pyrrolidone and dipropylene glycol was replaced with 2-pyrrolidone, the aqueous solution of the pigment dispersing resin A was replaced with the aqueous solution of the pigment dispersing resin C, and the cyan pigment was replaced with the magenta pigment listed in Table 4.

Example 9

An aqueous pigment dispersion was produced in the same manner as in Example 1 except that the aqueous solution of the pigment dispersing resin A was replaced with the aqueous solution of the pigment dispersing resin B and the cyan pigment was replaced with the magenta pigment listed in Table 4.

Example 10

An aqueous pigment dispersion was produced in the same manner as in Example 1 except that the 1:1 (volume ratio) mixed solvent of 2-pyrrolidone and dipropylene glycol was replaced with dipropylene glycol, the aqueous solution of the pigment dispersing resin A was replaced with the aqueous solution of the pigment dispersing resin B, and the cyan pigment was replaced with the magenta pigment listed in Table 4.

Example 11

An aqueous pigment dispersion was produced in the same manner as in Example 1 except that the 1:1 (volume ratio) mixed solvent of 2-pyrrolidone and dipropylene glycol was replaced with 2-pyrrolidone, the aqueous solution of the pigment dispersing resin A was replaced with the aqueous solution of the pigment dispersing resin C, and the cyan pigment was replaced with the yellow pigment listed in Table 4.

Example 12

An aqueous pigment dispersion was produced in the same manner as in Example 1 except that the 1:1 (volume ratio) mixed solvent of 2-pyrrolidone and dipropylene glycol was replaced with a 1:1 (volume ratio) mixed solvent of 2-pyrrolidone and propylene glycol, the aqueous solution of the pigment dispersing resin A was replaced with the aqueous solution of the pigment dispersing resin C, and the cyan pigment was replaced with the yellow pigment listed in Table 4.

Example 13

An aqueous pigment dispersion was produced in the same manner as in Example 1 except that the 1:1 (volume ratio) mixed solvent of 2-pyrrolidone and dipropylene glycol was replaced with 2-pyrrolidone, the aqueous solution of the pigment dispersing resin A was replaced with the aqueous solution of the pigment dispersing resin D, and the cyan pigment was replaced with the black pigment listed in Table 4.

Example 14

An aqueous pigment dispersion was produced in the same manner as in Example 1 except that the 1:1 (volume ratio) mixed solvent of 2-pyrrolidone and dipropylene glycol was replaced with 2-pyrrolidone, the aqueous solution of the pigment dispersing resin A was replaced with the aqueous solution of the pigment dispersing resin B, and the cyan pigment was replaced with the violet pigment listed in Table 4.

Example 15

An aqueous pigment dispersion was produced in the same manner as in Example 1 except that the 1:1 (volume ratio) mixed solvent of 2-pyrrolidone and dipropylene glycol was replaced with N-methylpyrrolidone, the aqueous solution of the pigment dispersing resin A was replaced with the aqueous solution of the pigment dispersing resin B, and the cyan pigment was replaced with the green pigment listed in Table 4.

Example 16

An aqueous pigment dispersion was produced in the same manner as in Example 1 except that the 1:1 (volume ratio) mixed solvent of 2-pyrrolidone and dipropylene glycol was replaced with 2-pyrrolidone, the aqueous solution of the pigment dispersing resin A was replaced with the aqueous solution of the pigment dispersing resin B, and the cyan pigment was replaced with the orange pigment listed in Table 4.

Example 17

An aqueous pigment dispersion was produced in the same manner as in Example 1 except that the 1:1 (volume ratio) mixed solvent of 2-pyrrolidone and dipropylene glycol was replaced with 2-pyrrolidone, the aqueous solution of the pigment dispersing resin A was replaced with the aqueous solution of the pigment dispersing resin E, and the cyan pigment was replaced with the red pigment listed in Table 4.

Comparative Example 1

An aqueous pigment dispersion was produced in the same manner as in Example 1 except that the 1:1 (volume ratio) mixed solvent of 2-pyrrolidone and dipropylene glycol was replaced with triethylene glycol.

Comparative Example 2

An aqueous pigment dispersion was produced in the same manner as in Example 1 except that the 1:1 (volume ratio) mixed solvent of 2-pyrrolidone and dipropylene glycol was replaced with glycerin.

Comparative Example 3

An aqueous pigment dispersion was produced in the same manner as in Example 1 except that the 1:1 (volume ratio) mixed solvent of 2-pyrrolidone and dipropylene glycol was replaced with methanol.

Comparative Example 4

An aqueous pigment dispersion was produced in the same manner as in Example 1 except that the 1:1 (volume ratio) mixed solvent of 2-pyrrolidone and dipropylene glycol was replaced with acetonitrile.

Comparative Example 5

An aqueous pigment dispersion was produced in the same manner as in Example 1 except that the 1:1 (volume ratio)

mixed solvent of 2-pyrrolidone and dipropylene glycol was replaced with triethylene glycol and the aqueous solution of the pigment dispersing resin A was replaced with the aqueous solution of the pigment dispersing resin B.

Comparative Example 6

An aqueous pigment dispersion was produced in the same manner as in Example 1 except that the 1:1 (volume ratio) mixed solvent of 2-pyrrolidone and dipropylene glycol was replaced with glycerin and the aqueous solution of the pigment dispersing resin A was replaced with the aqueous solution of the pigment dispersing resin B.

Comparative Example 7

An aqueous pigment dispersion was produced in the same manner as in Example 1 except that the 1:1 (volume ratio) mixed solvent of 2-pyrrolidone and dipropylene glycol was replaced with methanol and the aqueous solution of the pigment dispersing resin A was replaced with the aqueous solution of the pigment dispersing resin B.

Comparative Example 8

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin B, and the cyan pigment was replaced with the magenta pigment listed in Table 4.

Comparative Example 9

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin C, and the cyan pigment was replaced with the yellow pigment listed in Table 4.

Comparative Example 10

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin D, and the cyan pigment was replaced with the black pigment listed in Table 4.

Comparative Example 11

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin B, and the cyan pigment was replaced with the violet pigment listed in Table 4.

Comparative Example 12

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin B, and the cyan pigment was replaced with the green pigment listed in Table 4.

Comparative Example 13

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin B, and the cyan pigment was replaced with the orange pigment listed in Table 4.

Comparative Example 14

An aqueous pigment dispersion was produced in the same manner as in Example 1 except that the 1:1 (volume ratio) mixed solvent of 2-pyrrolidone and dipropylene glycol was replaced with triethylene glycol, the aqueous solution of the pigment dispersing resin A was replaced with the aqueous solution of the pigment dispersing resin E, and the cyan pigment was replaced with the red pigment listed in Table 4.

Tables 5 to 8 show whether the aqueous pigment dispersions according to Examples 1 to 18 and Comparative Examples 1 to 14 satisfy the formulae (1) to (4). In the tables, an aqueous pigment dispersion satisfying the formulae is represented by "O", and an aqueous pigment dispersion not satisfying the formulae is represented by "x".

TABLE 5

| Table 5 | Example 1 | Example 2 | Example 3 | Example 4 | Example 5 | Example 6 | Example 7 | Example 8 |
|---|---|---|---|---|---|---|---|---|
| Formula (1) | O | O | O | O | O | O | O | O |
| Formula (2) | O | X | O | O | X | O | X | X |
| Formula (3) | O | O | X | O | O | X | O | O |
| Formula (4) | O | O | O | O | O | O | O | O |

TABLE 6

| Table 6 | Example 9 | Example 10 | Example 11 | Example 12 | Example 13 | Example 14 | Example 15 | Example 16 |
|---|---|---|---|---|---|---|---|---|
| Formula (1) | ○ | ○ | ○ | ○ | ○ | ○ | ○ | ○ |
| Formula (2) | X | ○ | ○ | ○ | ○ | ○ | ○ | ○ |
| Formula (3) | ○ | X | ○ | ○ | ○ | ○ | ○ | ○ |
| Formula (4) | ○ | ○ | ○ | ○ | ○ | ○ | ○ | ○ |

TABLE 7

| Table 7 | Example 17 | Example 18 | Comparative example 1 | Comparative example 2 | Comparative example 3 | Comparative example 4 | Comparative example 5 | Comparative example 6 |
|---|---|---|---|---|---|---|---|---|
| Formula (1) | ○ | ○ | ○ | ○ | ○ | ○ | ○ | ○ |
| Formula (2) | ○ | ○ | ○ | X | X | X | ○ | X |
| Formula (3) | ○ | X | X | X | X | X | X | X |
| Formula (4) | ○ | ○ | X | X | X | ○ | X | X |

TABLE 8

| Table 8 | Comparative example 7 | Comparative example 8 | Comparative example 9 | Comparative example 10 | Comparative example 11 | Comparative example 12 | Comparative example 13 | Comparative example 14 |
|---|---|---|---|---|---|---|---|---|
| Formula (1) | ○ | ○ | ○ | ○ | ○ | ○ | ○ | ○ |
| Formula (2) | X | X | X | X | ○ | X | X | X |
| Formula (3) | X | X | X | X | X | X | X | X |
| Formula (4) | X | ○ | ○ | ○ | ○ | ○ | ○ | ○ |

Evaluation of Aqueous Pigment Dispersion

Method for Evaluating Dispersibility

The dispersibility of an aqueous pigment dispersion was evaluated on the basis of the volume-average particle size of a component contained in the aqueous pigment dispersion and the number of coarse particles.

Method for Measuring Volume-Average Particle Size

First, the aqueous pigment dispersions according to Examples and Comparative Examples were rapidly diluted 2000 to 10000 times with ion-exchanged water. The dilution ratios are listed in Table 9.

Subsequently, approximately 4 mL of each diluted aqueous pigment dispersion was poured into a cell. The volume-average particle size (MV) was measured by detecting scattered light of a laser beam at 25° C. with a Nanotrac particle size distribution analyzer "UPA150" manufactured by MicrotracBEL Corp.

A difference of approximately 10 nm in the volume-average particle size determined by the method resulted in a significant difference in dispersibility.

TABLE 9

| Table 9 | Dilution ratio (measurement of volume-average particle size) |
|---|---|
| Cyan pigment | 10000 |
| Magenta pigment | 2000 |
| Yellow pigment | 2000 |
| Violet pigment | 5000 |
| Green pigment | 10000 |
| Red pigment | 2000 |
| Orange pigment | 10000 |
| Black pigment | 5000 |

Method for Measuring Number of Coarse Particles

First, the aqueous pigment dispersions according to Examples and Comparative Examples were rapidly diluted 500 to 1000 times with ion-exchanged water. The dilution ratio was chosen for each aqueous pigment dispersion such that the number of particles 0.5 μm or more in diameter ranged from 1000 to 4000/mL as measured with a particle size distribution analyzer described below.

Subsequently, the number of particles 1.0 μm or more in diameter in the diluted aqueous pigment dispersion was measured three times with a number-counting particle size distribution analyzer (Accusizer 780 APS) manufactured by Particle Sizing Systems.

Subsequently, the measured value was multiplied by the dilute concentration to calculate the number of coarse particles. The number of coarse particles was determined by this method three times, and their average was considered to be the number of coarse particles of each aqueous pigment dispersion according to Examples and Comparative Examples.

TABLE 10

| Table 10 | Pigment | Pigment dispersing resin | Organic solvent | Volume-average particle size (nm) | Number of coarse particles (×10⁶/mL) |
|---|---|---|---|---|---|
| Comparative example 1 | Cyan (NC-CN) | A | Triethylene glycol | 112 | 15600 |
| Example 1 | | | 1:1 (volume ratio) mixed solvent of 2-pyrrolidone and dipropylene glycol | 103 | 900 |
| Example 2 | | | 2-pyrrolidone | 102 | 3800 |
| Example 3 | | | Dipropylene glycol | 106 | 1600 |
| Comparative example 2 | | | Glycerin | 123 | 50800 |
| Comparative example 3 | | | Methanol | 143 | 26400 |
| Comparative example 4 | | | Acetonitrile | 165 | 52500 |
| Comparative example 5 | | B | Triethylene glycol | 166 | 159100 |
| Example 4 | | | 1:1 (volume ratio) mixed solvent of 2-pyrrolidone and propylene glycol | 153 | 62300 |
| Example 5 | | | 2-pyrrolidone | 141 | 54000 |
| Comparative example 6 | | | Glycerin | 140 | 123800 |
| Comparative example 7 | | | Methanol | 282 | 1719400 |
| Example 6 | | | Dipropylene glycol | 144 | 28000 |
| Example 7 | | | N-methylpyrrolidone | 156 | 65000 |

TABLE 11

| Table 11 | Pigment | Pigment dispersing resin | Organic solvent | Volume-average particle size (nm) | Number of coarse particles (×10⁶/mL) |
|---|---|---|---|---|---|
| Comparative example 8 | Magenta | B | Triethylene glycol | 137 | 400 |
| Example 8 | | | 2-pyrrolidone | 129 | 80 |
| Example 9 | | | 2-pyrrolidone and dipropylene glycol 1:1 (volume ratio) mixed solvent | 125 | 40 |
| Example 10 | | | Dipropylene glycol | 133 | 200 |
| Comparative example 9 | Yellow | C | Triethylene glycol | 87 | 80 |
| Example 11 | | | 2-pyrrolidone | 74 | 90 |
| Example 12 | | | 1:1 (volume ratio) mixed solvent of 2-pyrrolidone and dipropylene glycol | 72 | 30 |
| Comparative example 10 | Black | D | Triethylene glycol | 93 | 400 |
| Example 13 | | | 2-pyrrolidone | 90 | 50 |
| Comparative example 11 | Violet | B | Triethylene glycol | 226 | 82600 |
| Example 14 | | | 2-pyrrolidone | 122 | 3100 |
| Comparative example 12 | Green | B | Triethylene glycol | 425 | 386000 |
| Example 15 | | | N-methylpyrrolidone | 216 | 51300 |
| Comparative example 13 | Orange | B | Triethylene glycol | 152 | 4000 |
| Example 16 | | | 2-pyrrolidone | 151 | 1500 |
| Comparative example 14 | Red | E | Triethylene glycol | 114 | 400 |
| Example 17 | | | 2-pyrrolidone | 91 | 100 |

REFERENCE SIGNS LIST

1 denotes the solubility sphere (a1) defined by the central coordinate ($\delta D^1$, $\delta P^1$, $\delta H^1$), which is represented by the dispersion term ($\delta D^1$), polarity term ($\delta P^1$), and hydrogen bonding term ($\delta H^1$) of the Hansen solubility parameter of the pigment dispersing resin (A), and the interaction radius (r1).

2 denotes the solubility sphere (a2) defined by the central coordinate ($\delta D^2$, $\delta P^2$, $\delta H^2$), which is represented by the dispersion term ($\delta D^2$), polarity term ($\delta P^2$), and hydrogen bonding term ($\delta H^2$) of the Hansen solubility parameter of the pigment dispersing resin (A), and the interaction radius (r2).

3 denotes the solubility sphere (b3) defined by the central coordinate ($\delta D^3$, $\delta P^3$, $\delta H^3$), which is represented by the dispersion term ($\delta D^3$), polarity term ($\delta P^3$), and hydrogen bonding term ($\delta H^3$) of the pigment (B), and the interaction radius (r3).

4 denotes the central coordinate ($\delta D^4$, $\delta P^4$, $\delta H^4$) represented by the dispersion term ($\delta D^4$)), polarity term

What is claimed is:

1. An aqueous cyan pigment dispersion comprising:
a pigment dispersing resin (A) having an acid value in the range of 50 to 300 mgKOH/g, a solubility sphere (a1) and a solubility sphere (a2);
a cyan pigment (B) having a solubility sphere (b3);
an organic solvent (C); and
water (D);
wherein the solubility sphere (a1) is defined by a central coordinate ($\delta D^1$, $\delta P^1$, $\delta H^1$) represented by a dispersion term ($\delta D^1$), a polarity term ($\delta P^1$), and a hydrogen bonding term ($\delta H^1$) of a Hansen solubility parameter and an interaction radius (r1),
wherein the solubility sphere (a2) is defined by a central coordinate ($\delta D^2$, $\delta P^2$, $\delta H^2$) represented by a dispersion term ($\delta D^2$), a polarity term ($\delta P^2$), and a hydrogen bonding term ($\delta H^2$) of a Hansen solubility parameter and an interaction radius (r2),
wherein the solubility sphere (a1) is derived from a hydrophobic structure of the pigment dispersing resin (A), and the solubility sphere (a2) is derived from a hydrophilic structure of the pigment dispersing resin (A),
wherein the solubility sphere (b3) is defined by a central coordinate ($\delta D^3$, $\delta P^3$, $\delta H^3$) represented by a dispersion term ($\delta D^3$), a polarity term ($\delta P^3$), and a hydrogen bonding term ($\delta H^3$) of a Hansen solubility parameter and an interaction radius (r3),
wherein a combination of the pigment dispersing resin (A) and the cyan pigment (B) satisfies the following formula (1), $$[4\times(\delta D^3-D^1)^2+(\delta P^3-\delta P^1)^2+(\delta H^3-\delta H^1)^2]^{1/2} \leq [r1+r3] \quad (1),\text{ and}$$

wherein a central coordinate ($\delta D^4$, $\delta P^4$, $\delta H^4$) represented by a dispersion term ($\delta D^4$), a polarity term ($\delta P^4$), and a hydrogen bonding term ($\delta H^4$) of a Hansen solubility parameter of the organic solvent (C) satisfies the formula (4) and at least one of the following formulae (2) and (3), $$[4\times(\delta D^4-\delta D^1)^2+(\delta P^4-\delta P^1)^2+(\delta H^4-\delta H^1)^2]^{1/2} \leq r1 \quad (2)$$

$$[4\times(\delta D^4-\delta D^3)^2+(P^4-P^3)^2+(\delta H^4-\delta H^3)^2]^{1/2} \leq r3 \quad (3)$$

$$[4\times(\delta D^4-\delta D^2)^2+(\delta P^4-\delta P^2)^2+(\delta H^4-\delta H^2)^2]^{1/2} \geq r2 \quad (4).$$

2. The aqueous cyan pigment dispersion according to claim 1, wherein the pigment dispersing resin (A) is a copolymer of a monomer component containing a monomer having a hydrophobic group and a monomer having a hydrophilic group.

3. The aqueous cyan pigment dispersion according to claim 1, wherein a mass ratio [structural unit (z1)/structural unit (z2)] of a structural unit (z1) derived from the monomer having a hydrophobic group to a structural unit (z2) derived from the monomer having a hydrophilic group in the copolymer ranges from 1.0 to 7.5.

4. The aqueous cyan pigment dispersion according to claim 1, wherein a central coordinate ($\delta D^4$, $\delta P^4$, $\delta H^4$) represented by a dispersion term ($\delta D^4$), a polarity term ($\delta P^4$), and a hydrogen bonding term ($\delta H^4$) of a Hansen solubility parameter of the organic solvent (C) satisfies all the formulae (2), (3), and (4).

5. A method for producing an aqueous cyan pigment dispersion comprising a pigment dispersing resin (A), a cyan pigment (B), an organic solvent (C), and water (D), the method comprising:
mixing the pigment dispersing resin (A) having an acid value in the range of 50 to 300 mgKOH/g, a solubility sphere (a1) and a solubility sphere (a2); the cyan pigment (B) has a solubility sphere (b3); the organic solvent (C); and the water (D),
wherein the solubility sphere (a1) is defined by a central coordinate ($\delta D^1$, $\delta P^1$, $\delta H^1$) represented by a dispersion term ($\delta D^1$), a polarity term ($\delta P^1$), and a hydrogen bonding term ($\delta H^1$) of a Hansen solubility parameter and an interaction radius (r1),
wherein the solubility sphere (a2) is being defined by a central coordinate ($\delta D^2$, $\delta P^2$, $\delta H^2$) represented by a dispersion term ($\delta D^2$), a polarity term ($\delta P^2$), and a hydrogen bonding term ($\delta H^2$) of a Hansen solubility parameter and an interaction radius (r2),
wherein the solubility sphere (a1) is derived from a hydrophobic structure of the pigment dispersing resin (A), and the solubility sphere (a2) is derived from a hydrophilic structure of the pigment dispersing resin (A),
wherein the solubility sphere (b3) is defined by a central coordinate ($\delta D^3$, $\delta P^3$, $\delta H^3$) represented by a dispersion term ($\delta D^3$), a polarity term ($\delta P^3$), and a hydrogen bonding term ($\delta H^3$) of a Hansen solubility parameter and an interaction radius (r3),
wherein a combination of the pigment dispersing resin (A) and the cyan pigment (B) is chosen in such a way as to satisfy the following formula (1), $$[4\times(\delta D^3-D^1)^2+(\delta P^3-\delta P^1)^2+(\delta H^3-\delta H^1)^2]^{1/2} \leq [r1+r3] \quad (1),\text{ and}$$

wherein a central coordinate ($\delta D^4$, $\delta P^4$, $\delta H^4$) represented by a dispersion term ($\delta D^4$), a polarity term ($\delta P^4$), and a hydrogen bonding term ($\delta H^4$) of a Hansen solubility parameter of the organic solvent (C) is chosen in such a way as to satisfy the formula (4) and at least one of the following formulae (2) and (3), $$[4\times(\delta D^4-\delta D^1)^2+(\delta P^4-\delta P^1)^2+(\delta H^4-\delta H^1)^2]^{1/2} \leq r1 \quad (2)$$

$$[4\times(\delta D^4-\delta D^3)^2+(P^4-P^3)^2+(\delta H^4-\delta H^3)^2]^{1/2} \leq r3 \quad (3)$$

$$[4\times(\delta D^4-\delta D^2)^2+(\delta P^4-\delta P^2)^2+(\delta H^4-\delta H^2)^2]^{1/2} \geq r2 \quad (4).$$

6. The aqueous cyan pigment dispersion according to claim 1, wherein the aqueous cyan pigment includes particle size of 0.5 μm or more at a content of 900 to 65,000 ($10^6$/ml).

7. The method for producing an aqueous cyan pigment dispersion according to claim 5, wherein the aqueous cyan pigment includes particle size of 0.5 μm or more at a content of 900 to 65,000 ($10^6$/ml).

8. The aqueous cyan pigment dispersion according to claim 1, wherein the acid value is in the range of 120 to 200 mgKOH/g.

9. The method for producing an aqueous cyan pigment dispersion according to claim 5, wherein the acid value in the range of 120 to 200 mgKOH/g.

* * * * *